United States Patent
Zucchi (10) Patent No.: US 10,124,376 B2
(45) Date of Patent: Nov. 13, 2018

(54) MOBILE PLANT FOR ASPIRATION AND TREATMENT OF FUMES AND/OR DUST AND/OR GASEOUS MIXTURES

(71) Applicant: G.A.P. S.P.A., Sovere (Bergamo) (IT)

(72) Inventor: Francesco Zucchi, Cremona (IT)

(73) Assignee: G.A.P. S.P.A., Sovere (IT)

( * ) Notice: Subject to any disclaimer, the term of this patent is extended or adjusted under 35 U.S.C. 154(b) by 835 days.

(21) Appl. No.: 14/410,072

(22) PCT Filed: Apr. 30, 2013

(86) PCT No.: PCT/IB2013/053398
§ 371 (c)(1),
(2) Date: Dec. 20, 2014

(87) PCT Pub. No.: WO2014/006522
PCT Pub. Date: Jan. 9, 2014

(65) Prior Publication Data
US 2015/0298183 A1    Oct. 22, 2015

(30) Foreign Application Priority Data
Jul. 3, 2012 (IT) .............................. RM2012A0309

(51) Int. Cl.
*B08B 15/02* (2006.01)
*E04B 1/343* (2006.01)

(52) U.S. Cl.
CPC .......... *B08B 15/02* (2013.01); *E04B 1/34368* (2013.01)

(58) Field of Classification Search
CPC ..................... E04B 1/34368; E04B 1/34305
See application file for complete search history.

(56) References Cited

U.S. PATENT DOCUMENTS 2,939,378 A * 6/1960 Zalkind ................... B08B 15/02
                                                         454/63
3,256,896 A * 6/1966 Cummins ................ B60J 7/062
                                                         135/131
(Continued)

FOREIGN PATENT DOCUMENTS

DE    1409425 A1 * 10/1968  ............... A01G 9/14
DE    39 32 906 A1    4/1991
(Continued)

*Primary Examiner* — Gregory Huson
*Assistant Examiner* — Frances F Hamilton
(74) *Attorney, Agent, or Firm* — Pearne & Gordon LLP (57) ABSTRACT

Described is a mobile plant for the aspiration, treatment, suppression and depuration of fumes and/or dust and/or gaseous mixtures coming from processing of metals or other materials, and in particular from the processing of the metals with flame cutting, by means of which even small production units or larger production units but with limited quantities of materials to be processed or processed in an occasional manner with significant emission of fumes and/or dust can prevent the dispersion into the atmosphere of the fumes and/or dust and can treat the fumes and dust; according to this invention, the mobile plant for the aspiration, treatment, suppression and depuration of fumes and/or dust and/or gaseous mixtures coming from processing of metals or other materials comprises two separate units which integrate and act in conjunction with each other: a removable and transportable hood which is movable from a processing area to a standby area, under which the processing is performed which cause fumes and dust, and which has the purpose of preventing the dispersion of the fumes and dust into the atmosphere, a mobile and transportable plant for the aspiration and treatment of the fumes and dust present in the hood, the two parts being connected by connectors.

17 Claims, 5 Drawing Sheets

(56) References Cited

U.S. PATENT DOCUMENTS

| | | | | |
|---|---|---|---|---|
| 3,774,522 A | * | 11/1973 | Marsh | A61G 10/02 454/187 |
| 4,058,299 A | * | 11/1977 | Lindkvist | B08B 15/002 266/48 |
| 4,532,886 A | * | 8/1985 | Bouchard | B05B 15/1214 118/326 |
| 4,666,472 A | * | 5/1987 | Klimczak | B01D 46/0041 55/302 |
| 4,667,692 A | * | 5/1987 | Tury | E04H 15/18 135/139 |
| 4,714,010 A | * | 12/1987 | Smart | B08B 15/02 118/425 |
| 4,719,935 A | * | 1/1988 | Gustafson | E04H 15/10 135/124 |
| 4,883,512 A | * | 11/1989 | Griffis | B01D 46/00 135/121 |
| 6,109,283 A | * | 8/2000 | Burke | E04H 15/52 135/129 |
| 6,132,509 A | * | 10/2000 | Kuschnereit | B01D 29/27 118/317 |
| 6,438,900 B1 | * | 8/2002 | Page | E04H 6/04 52/2.16 |
| 6,648,748 B1 | * | 11/2003 | Ferlin | B08B 15/002 454/65 |
| 6,679,009 B2 | * | 1/2004 | Hotes | E04H 15/36 135/117 |
| 2003/0145882 A1 | * | 8/2003 | Sanna | B60J 7/026 135/128 |
| 2006/0254160 A1 | * | 11/2006 | Lee | E04B 1/34305 52/67 |
| 2007/0090629 A1 | * | 4/2007 | Ohnstad | B05B 15/1214 280/656 |
| 2009/0217869 A1 | * | 9/2009 | Froehlich | B05B 13/0431 118/323 |
| 2011/0313218 A1 | * | 12/2011 | Dana | B01D 1/14 585/240 |
| 2014/0235153 A1 | * | 8/2014 | Rankin | B08B 15/02 454/63 |

FOREIGN PATENT DOCUMENTS

| | | | | |
|---|---|---|---|---|
| DE | 297 13 686 U1 | | 10/1997 | |
| DE | 10321924 A1 | * | 12/2004 | B05B 15/1214 |
| DE | 10 2005 032124 A1 | | 1/2007 | |
| DE | 20 2009 005832 U1 | | 7/2009 | |
| DE | 20 2009 005832 | * | 8/2009 | |
| EP | 0 504 664 A1 | | 9/1992 | |
| EP | 1 477 235 A2 | | 11/2004 | |
| EP | 1477235 A2 | * | 11/2004 | B05B 15/1214 |
| EP | 1983118 A2 | * | 10/2008 | E04B 1/34305 |
| FR | 2546943 A1 | * | 12/1984 | E04B 1/14 |
| FR | 2 794 448 A1 | | 12/2000 | |
| GB | 235713 A | * | 6/1925 | E04B 1/3205 |
| GB | 737930 A | * | 10/1955 | E04H 6/04 |
| GB | 1170393 A | * | 11/1969 | B63B 19/18 |
| GB | 1425814 A | * | 2/1976 | E04B 1/34368 |
| GB | 2 214 945 A | | 9/1989 | |
| JP | 3081598 U | | 11/2013 | |
| WO | WO 2012068611 A1 | * | 5/2012 | B05B 15/1214 |

* cited by examiner

MOBILE PLANT FOR ASPIRATION AND TREATMENT OF FUMES AND/OR DUST AND/OR GASEOUS MIXTURES

Amongst the techniques for processing metals, one of the most widespread is the flame cutting technique which is a manual type process, not replaceable, with which ferrous scrap of dimensions such that it cannot be used for melting is reduced in size so that it may be used. This technique is applied to ferrous scrap of large dimensions coming from industrial demolitions or to waste material of the steel production cycle (tundish, drippings, ladle slag, beams, etc.) or processing waste which is unsuitable for sale (bloom, flat bloom, cylinders, beams etc.). The technique uses oxygen lance cutting equipment which is based on the mixing of gas, a gaseous fuel for example propane or acetylene and the other comburent oxygen.

The gases are mixed using the cutting torch, when the thicknesses are not excessive, and by using a lance for larger thicknesses and dimensions. This technique is essential for reducing the size of ferrous scrap or other processing waste to dimensions such that it can be sent for melting, but it has major drawbacks from the environmental point of view as it generates a considerable quantity of fumes or dust, which are usually dispersed into the atmosphere with consequent health problems especially for the health of the cutting operators. These processes are normally carried out in the open air and the absence of plants for the aspiration and treatment of fumes and dust is very common and only a part of the steel works is equipped with plants for the aspiration and treatment of fumes. In the steel works where a fixed plant for the aspiration and treatment of fumes would be financially too onerous with respect to the quantity of products treated, the fumes and the dust is dispersed into the atmosphere, thereby obviously affecting also the flame cutting operators.

This invention relates to a mobile plant for the aspiration and treatment of fumes and dust coming from processing of metals or other materials, and in particular from the processing of the metals with flame cutting, by means of which even for small quantities of materials to be processed with significant emission of fumes and/or dust the dispersion into the atmosphere of the fumes and/or dust can be prevented and the fumes and dust can be treated.

According to this invention, the mobile plant for the aspiration and treatment of the fumes and dust coming from processing metals or other materials and in particular from the processing of the metals with the flame cutting technique comprises two separate units which integrate and act in conjunction with each other:
  a removable and transportable hood which is movable from a processing area to a standby area, under which the processing is performed which cause fumes and dust, and which has the purpose of preventing the dispersion of the fumes and dust into the atmosphere
  a mobile and transportable plant for the aspiration and treatment of the fumes and dust present in the hood.

The hood preferably has a tunnel shape and can be moved from a work area to a standby area, sliding on a frame comprising guides equipped in the part facing the ground with adjustable feet so that it can be adapted to any type of ground and in the upper part with rails in which wheels integral with the lower part of the hood run, so that they can be located, when in the operating position above the work area and when in the standby position outside the work area which is therefore uncovered in such a way as to facilitate as much as possible the loading and unloading of the materials to be treated.

The hood has:
  a suitable number of modules, preferably tunnel-shaped, each comprising an arch frame subdivided into three sectors hinged together to facilitate transport, and elements made of thin material, for example sheet metal, fixed to the arch frame (by means of rivets or the like) which constitute the coverage of the tunnel-shaped module;
  a rear wall with a semicircular shape equipped with grilles through which the fumes are sucked, made integral with the lower frame, and having a radius less than the radius of the tunnel-shaped hood in such a way that the tunnel-shaped hood complete with a front wall, can slide along the tracks and above the rear part;
  a front wall, made integral with the arch frame, equipped with cladding which can be moved and/or opened, preferably doors of adequate dimensions equipped with windows in the upper part which make the operator visible from the outside and grills for the passage of air in the lower part.

In a preferred embodiment, the hood comprises more than one body or module in the form of a tunnel which can be attached and locked together quickly and easily; each frame of the modules in the shape of a tunnel comprises, in one of the preferred embodiments, three arch segments, hinged together, which are positioned in the correct position by a crane or the like and then locked with special bolts. The arch-shaped frames of each individual module comprise, in a preferred embodiment, C-shaped metallic elements to which the covering elements made of thin and resistant material are fixed. A joint cover, located at the top of each pair of modules prevents the passage of rain.

The openings present on the rear part of the hood are connected by means of conduits to the plant for aspiration and treatment of the fumes.

The plant for aspiration of the fumes comprises a module with dimensions suitable for allowing transportation and groups together inside a system for aspiration and expulsion of the fumes, a system for filtration of the fumes, an air compressor, a generator unit preferably motor-driven, silenced and designed to provide energy, preferably electricity, sufficient for operation of the entire mobile plant. As mentioned above, the plant for aspiration of the fumes is connected to the openings present in the rear part of the hood by means of conduits through which the fumes and the dust are sucked for being treated by the filter.

The total transportability of the mobile plant for aspiration of fumes and dust according to this invention from one steel works to the other and from one work place to the other allows the use by a plurality of users with the consequent limitation of the costs.

The mobile plant for aspiration and treatment of the fumes and dust coming from processing metals or other materials and in particular from the processing of the metals with the flame cutting technique according to this invention is described below in a non-limiting embodiment by way of an example with reference to the accompanying drawings, in which.

With reference to the above-mentioned drawings the mobile plant for aspiration and treatment of the fumes and dust coming from processing metals or other materials and in particular from the processing of the metals with the flame cutting technique according to this invention in the non-limiting embodiment shown by way of an example in the accompanying drawings comprises:

a mobile and removable hood (1), preferably in the form of a tunnel, under which the processing is carried out which causes the emission of fumes and dust;

a moveable plant (2) for aspiration and treatment of the fumes, connected by suitable manifolds (3) to the hood (1) which segregates the fumes and the dust caused by the processing which takes place below in such a way that the aspiration system can discharge it without it being dispersed.

Figure 1:
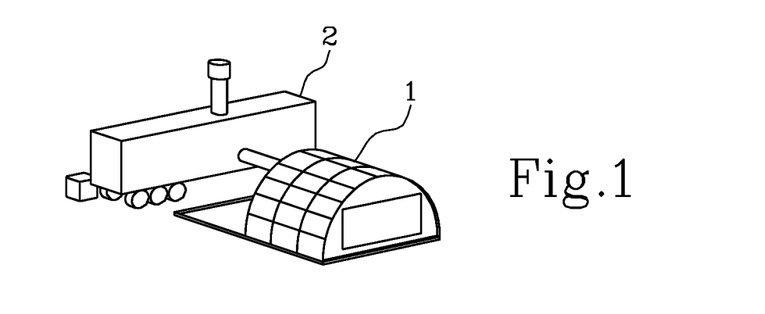
FIG. 1 is a schematic perspective front view from above of the mobile plant for aspiration and treatment of the fumes and dust according to this invention.
Figure 2:
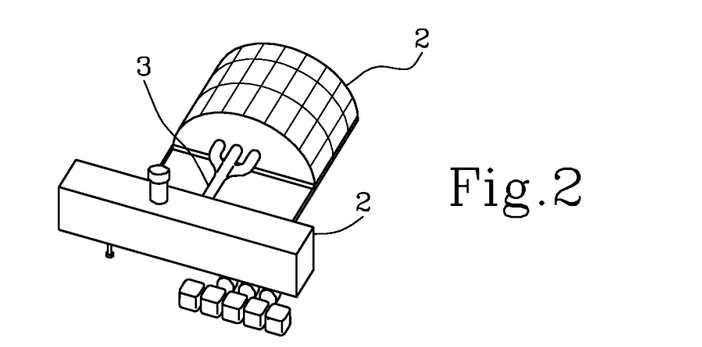
FIG. 2 is a schematic perspective rear view from above of the mobile plant for aspiration and treatment of the fumes and dust according to this invention.
Figure 3:
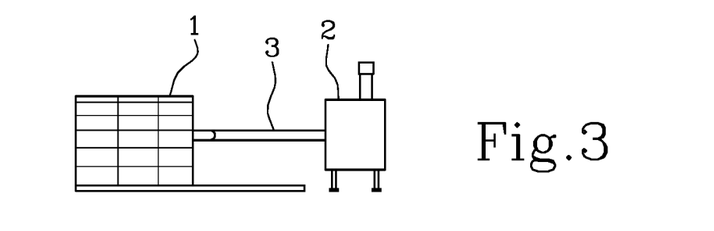
FIG. 3 is a schematic perspective side view from above of the mobile plant for aspiration and treatment of the fumes and dust according to this invention.
Figure 4:
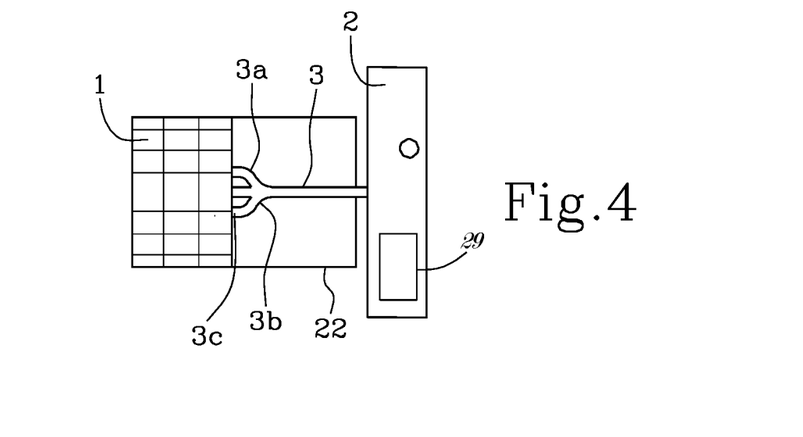
FIG. 4 is a schematic view from above of the mobile plant for aspiration and treatment of the fumes and dust according to this invention.
Figures 5, 6:
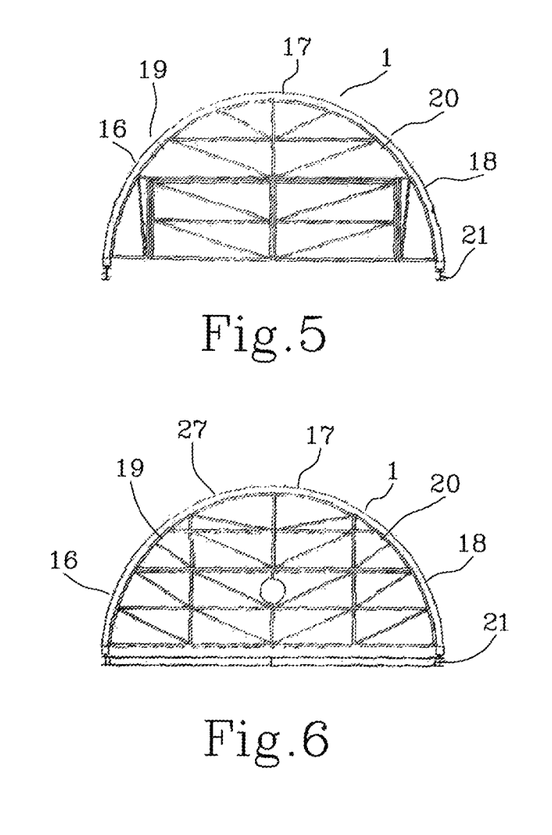
FIG. 5 is a schematic front view of the tunnel of the mobile plant for aspiration and treatment of the fumes and dust according to this invention.
FIG. 6 is a schematic rear view of the tunnel of the mobile plant for aspiration and treatment of the fumes and dust according to this invention.
Figures 7, 8:
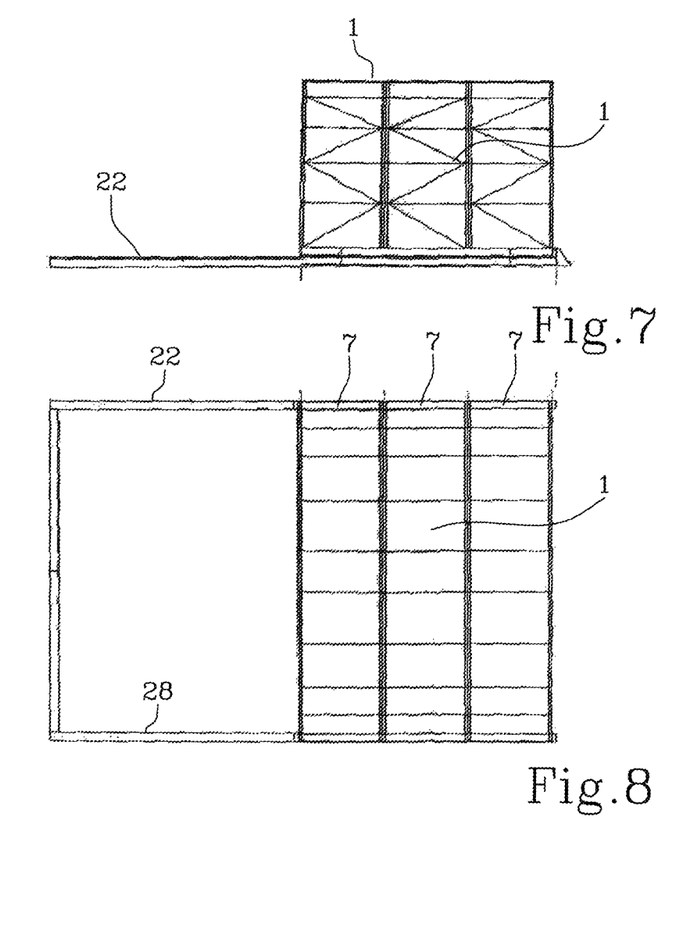
FIG. 7 is a schematic side view of the tunnel of the mobile plant for aspiration and treatment of the fumes and dust according to this invention.
FIG. 8 is a schematic view from above of the tunnel of the mobile plant for aspiration and treatment of the fumes and dust according to this invention.
Figure 9:
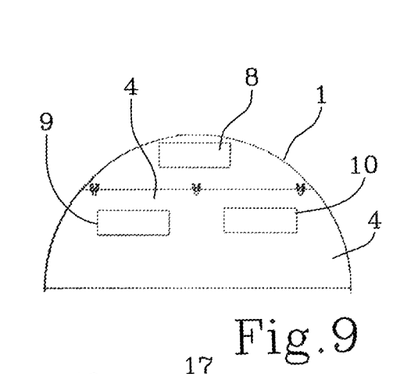
FIG. 9 is a schematic rear view of the tunnel.
Figure 10:
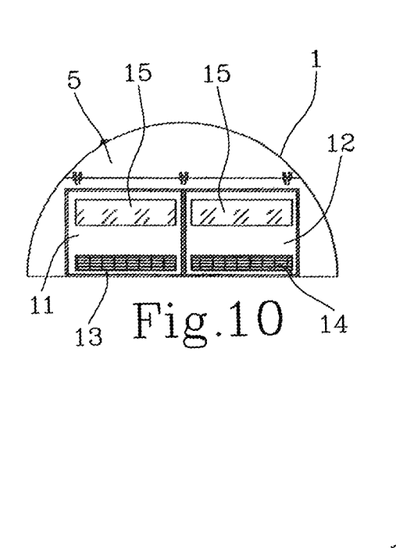
FIG. 10 is a schematic front view of the tunnel.
Figure 11:
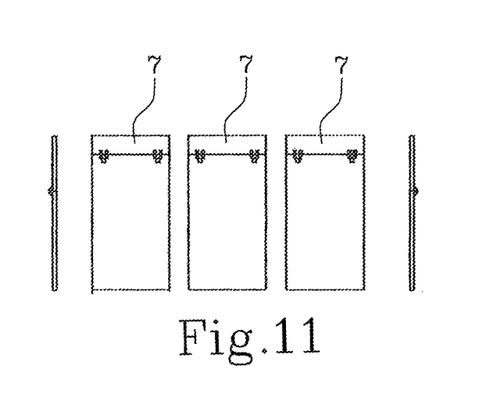
FIG. 11 is a schematic side view of the individual modules which make up the tunnel.
Figure 12:
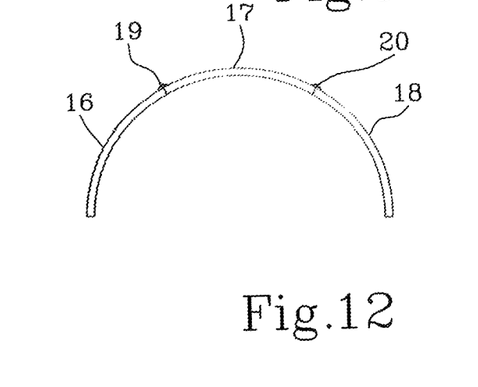
FIG. 12 is a transversal cross section of a module of the tunnel in an operating configuration.
Figure 13:
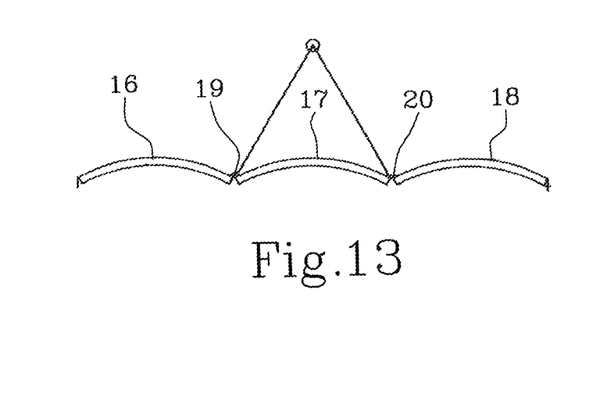
FIG. 13 is a transversal cross section of a frame of the tunnel in a step before assembly.
Figure 14:
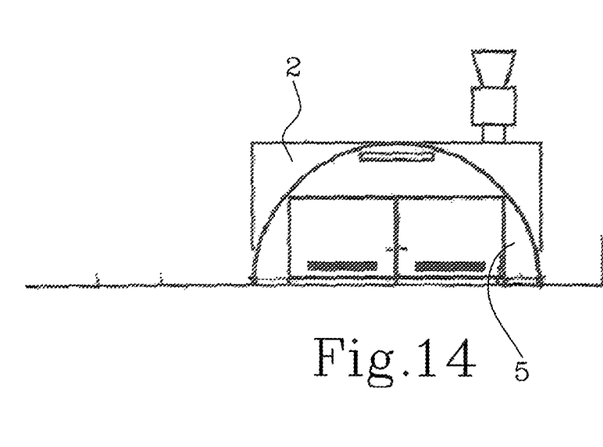
FIG. 14 is a schematic front view of the tunnel with the fumes aspiration plant.

The hood (1) comprises more than one body or module (7) in the form of a tunnel which can be attached and locked together quickly and easily; each module (7) in the shape of a tunnel comprises, in one of the preferred embodiments, three arch segments (16, 17, 18), with the central arch segment (17) hinged with the hinges (19 and 20) to the two lateral arch segments (16 and 18); the three arch segments (16, 17, 18) are positioned in the correct position by a crane or the like and then locked with special bolts (FIG. 13). The arch-shaped frames of each individual module comprise, in a preferred embodiment, C-shaped metallic elements (25) to which the covering elements (27) made of thin and resistant material are fixed. A joint cover (26), located at the top of each pair of modules (7) prevents the passage of rain; the tunnel-shaped hood (1) also comprises a rear wall (4) and a front wall (5).

The rear wall (4) has a radius less than that of the tunnel (1) and is integral with the lower frame, in such a way that it also remains fixed in its position during movement of the tunnel (1) from the position covering the working area to the position in which the working area is uncovered, in practice during movement of the tunnel (1) it passes above the rear wall (4); the rear wall (4) has one or more (preferably three) openings (8, 9, 10) in which grilles can be housed and to which the manifolds (3a, 3b, 3c) are fixed which by means of the manifold (3) are connected to the plant (2) for aspiration and treatment of the fumes.

The opening (8) is positioned at the top in the upper part of the rear wall (4) and it is designed to suck the fumes which, being mostly hot, concentrate themselves in the top of the hood (1), any additional openings (9 and 10) are located on the rear wall (4) lower down at a distance of approximately 1.50 m from the ground with the main purpose of sucking the fumes, thus preventing them from reaching the operator who is performing the processing.

Various types of cladding can be installed on the front wall (5); two doors (11 and 12) are preferably installed, equipped with windows (15) which make visible the operator who is performing the processing; beneath the windows (15) there are two grilles (13 and 14) which ensure the passage of a sufficient quantity of air inside the hood (1).

Figures 15, 16:
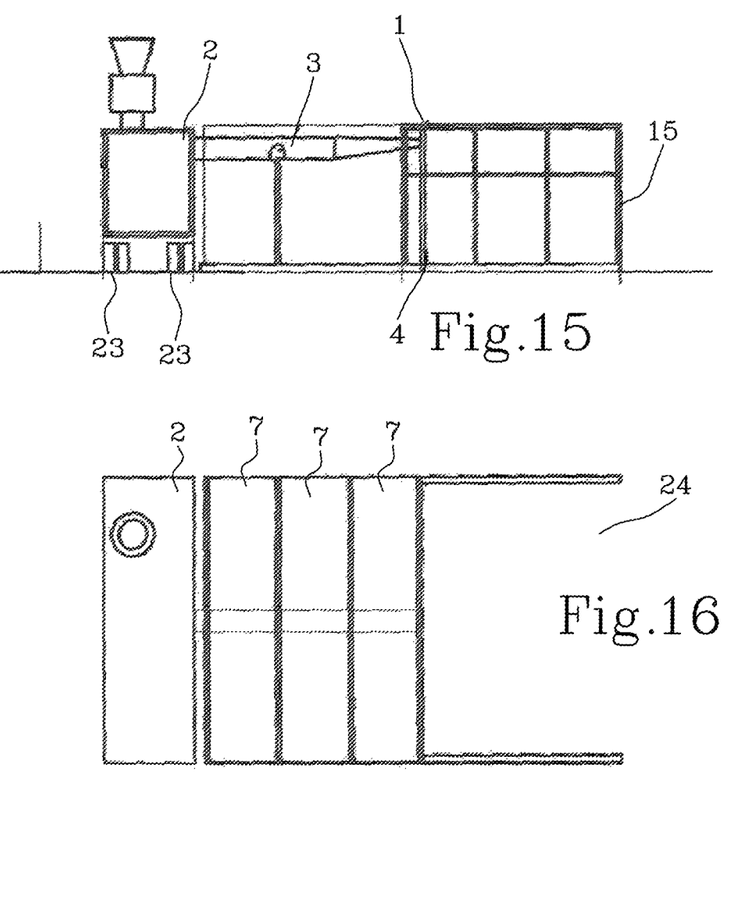
FIG. 15 is a schematic side view of the tunnel in an operating position and of the fumes aspiration plant.
FIG. 16 is a schematic plan view of the fumes aspiration plant, of the tunnel in in a standby position and of the uncovered cutting zone.
Figure 17:
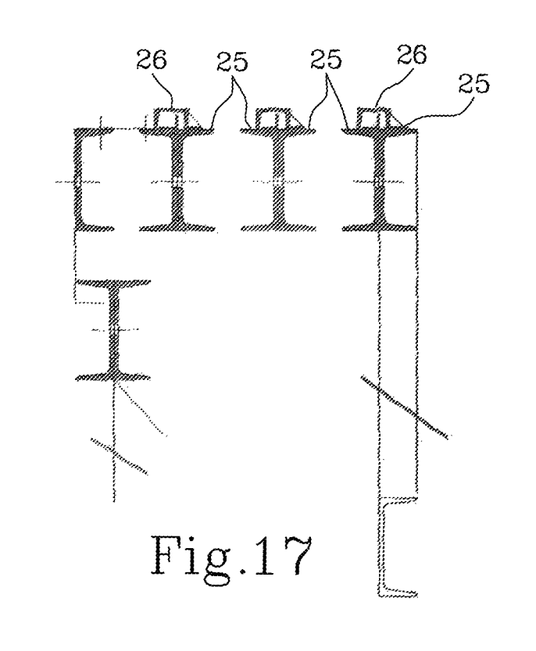
FIG. 17 is a schematic cross section of the three coupled modules (of the tunnel hood) and of the joint covers.
Figure 18:
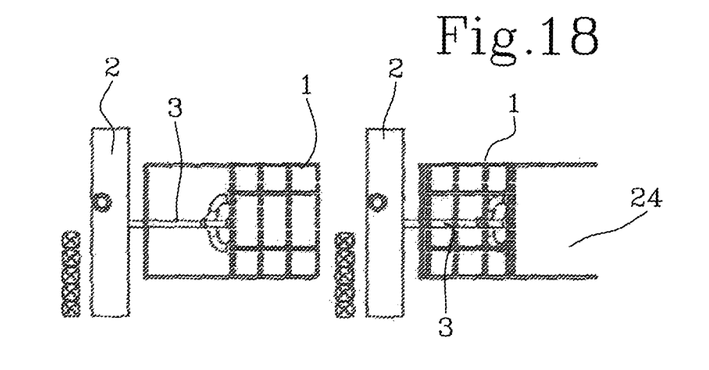
FIG. 18 is a schematic view from above of the hood in the closed and open position.

The lower part of the hood (1), or rather of the arch-shaped frames, is equipped with wheels (21) which run on the tracks (22) of the frame (28) resting on or fixed to the ground and equipped with adjustable feet; the wheels (21) allow the hood (1) to be moved to the position for covering the processing/cutting zone (FIG. 15) or for locating it in the position in which the processing/cutting zone (24) is completely uncovered (FIG. 16), for allowing the discharge of the materials to be cut also with mechanical means.

The movement of the hood (1) from the working position to the standby position is, in a preferred embodiment, motor-driven and there are obviously all the safety devices necessary and required by the current regulations.

One of the aims of this invention is that the plant for aspiration and treatment of the fumes and dust coming from processing metals or other materials is mobile and can be transported because only this feature makes the costs acceptable even with limited quantities of material to be processed. For this purpose, the tunnel-shaped hood (1) is completely removable in parts which are easily transportable with motor vehicles and it can be assembled quickly by 2 operators.

The mobile plant (2) for aspiration and treatment of fumes, connected by suitable manifolds (3) and (3a, 3b, 3c) to the hood (1) comprises, in a preferred embodiment, a single module of suitable dimensions, which can be transported on a single vehicle and has, for example, the following dimensions: length 13.5 m, width 2.5 m and height 2.8 m; the module is equipped with container type fasteners and can be loaded and unloaded both from above and from below thanks to the presence of the guides for forks; the mobile plant (2) for aspiration and treatment of fumes can work permanently resting on the transport platform (23) of the vehicle or resting on the ground with its legs suitably arranged; the mobile plant (2) for aspiration and treatment of fumes is equipped with:

a filtration system comprising a group of filters preferably of the sleeve type, with a sparks suppression chamber, dust recovery hopper with automatic discharge screw conveyors, suitable for typically guaranteeing a flow rate of 36,000 m³/h, an aspiration system equipped with a centrifugal fan installed downstream of the filter typically with an effective flow rate of 36,000 m³/h, connected to the expulsion chimney, silenced at its end. The fan is equipped with an inverter for guaranteeing the correct flow rate and optimising the energy and maintenance consumptions;

an air compressor feeding the automatic cleaning system of the sleeve filters which, using the compressed air produced, allows, using blowing pipes, for a counter pressure to be generated inside the sleeve sufficient for its cleaning; it is all controlled by a special electrical panel;

a silenced and compact motor generator unit inside the module, which has the purpose of making the entire system self-contained, supplying the electricity sufficient for the entire operation.

The use of the plant is simple; firstly, the motor generator is switched ON or a connection is made to the mains electricity supply, the compressor is switched ON or a connection is made to the fixed compressed air system, the aspiration plant is switched ON from the control panel, the doors (11, 12) of the hood are opened, the electrical control of the hood is actuated, moving it outside the cutting zone (24), the pieces to be cut are positioned in the cutting zone (24), the hood is repositioned above the cutting zone (24) closing the doors (11, 12) and the cutting or other processing is started. The fumes and the dust are sucked and sent to the treatment processes.

The invention claimed is:

1. A mobile plant for aspiration, treatment, suppression and depuration of fumes and/or dust and/or gaseous mixtures coming from processing of metals or other materials, the mobile plant comprising:
   a covering of a processing zone,
   a plant for aspiration and treatment of the fumes and/or dust and/or gaseous mixtures present in the processing zone,
   a manifold in fluid communication with the processing zone and the plant, and
   a filtration system acting in conjunction with the covering and the plant,
   wherein the covering comprises a hood disassembleable and movable on tracks between an operating position above a work area and a standby position outside the work area;
   wherein the hood is tunnel-shaped, having a radius, and comprises:
      a front wall integral with the hood and which can be at least partially opened, the front wall and the hood being slidable on the tracks from and/or to the work area;
      a rear wall integral with a frame, which is restable on or fixable to the ground under operational conditions of the plant, in such a way that the rear wall remains fixed during movement of the hood, the rear wall having a radius less than the radius of the tunnel-shaped hood in such a way that the tunnel-shaped hood complete with the front wall, can slide along the tracks and above the rear wall,
   wherein the manifold is exposed when the hood is in the operating position and covered by the hood in the standby position.

2. The mobile plant according to claim 1, wherein the plant for aspiration and treatment of fumes and/or dust and/or gaseous mixtures comprises a single module movable on wheels.

3. The mobile plant according to claim 1, wherein the tracks are fixed on the frame.

4. The mobile plant according to claim 1, wherein the hood being movable on wheels slidably engaged in tracks associated with the frame, the frame being restable on or fixable to the ground under operational conditions of the plant, the work area being comprised between the tracks.

5. The mobile plant according to claim 4, wherein the hood is movable on the tracks, actuated by motors.

6. The mobile plant according to claim 4, wherein the plant is connected by manifolds to the hood.

7. The mobile plant according to claim 1, wherein the rear wall is equipped with openings which can be connected with the plant for aspiration and treatment of fumes and/or dust and/or gaseous mixtures.

8. The mobile plant according to claim 7, wherein the rear wall has one or more openings connected by the manifold to a single module.

9. The mobile plant according to claim 7, further comprising doors which can be opened in the rear wall.

10. The mobile plant according to claim 8, wherein at least one opening is positioned in an upper part of the rear wall.

11. The mobile plant according to claim 8, wherein at least one opening is positioned in a lower part of the rear wall.

12. The mobile plant according to claim 9, wherein the doors have windows positioned in an upper part of the doors.

13. The mobile plant according to claim 9, wherein the doors have grilles positioned in a lower part of the doors.

14. The mobile plant according to claim 1, wherein the hood comprises a plurality of modules, at least one of the modules having a tunnel shape, the modules being mutually attachable and lockable with each other.

15. The mobile plant according to claim 14, further comprising at least one joint cover suitable to prevent the passage of rain, the joint cover being positioned on a top portion of at least one pair of modules.

16. The mobile plant according to claim 14, wherein each module comprises arch frames, wherein each arch frame is formed by a central arch segment hinged to respective lateral arch segments (16, 18); each of the arch segments (16, 17, 18) being made integral with covering portions of material for forming the covering of the module.

17. The mobile plant according to claim 16, wherein the arch segments comprise metallic elements with a "C" section.

* * * * *

UNITED STATES PATENT AND TRADEMARK OFFICE
CERTIFICATE OF CORRECTION

PATENT NO. : 10,124,376 B2
APPLICATION NO. : 14/410072
DATED : November 13, 2018
INVENTOR(S) : Francesco Zucchi Page 1 of 1

It is certified that error appears in the above-identified patent and that said Letters Patent is hereby corrected as shown below:

In the Claims

Column 6, Line 52, being Line 4 of Claim 16, after "segments" (first occurrence), delete "(16, 18)" and after "segments" (second occurrence), delete "(16, 17,".

Column 6, Line 53, being Line 5 of Claim 16, before "being", delete "18)".

Signed and Sealed this
Fifth Day of February, 2019

Andrei Iancu
*Director of the United States Patent and Trademark Office*